Feb. 10, 1942.   G. A. PETROE   2,272,818
METHOD OF TREATING SOLUTIONS
Filed July 27, 1939
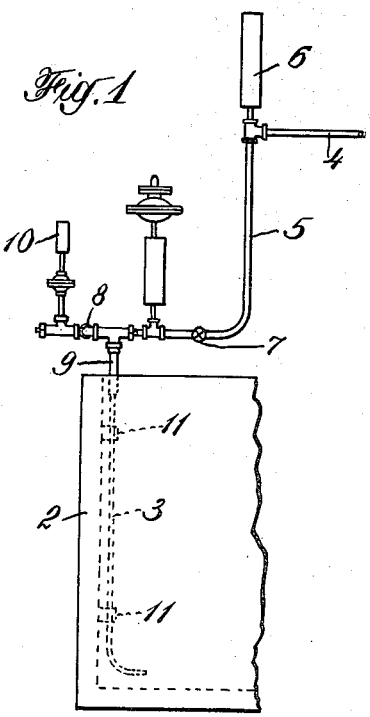
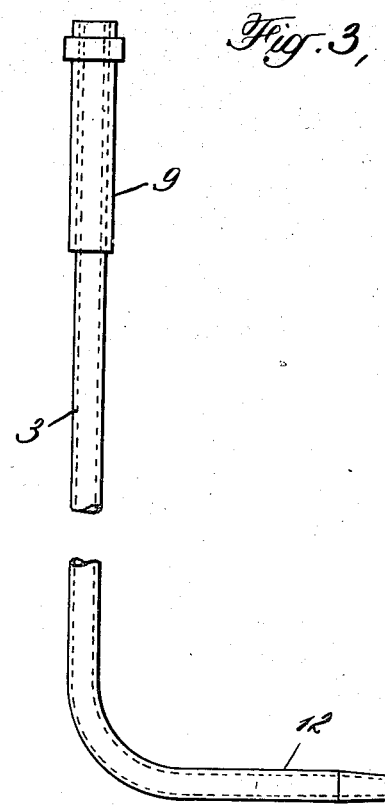
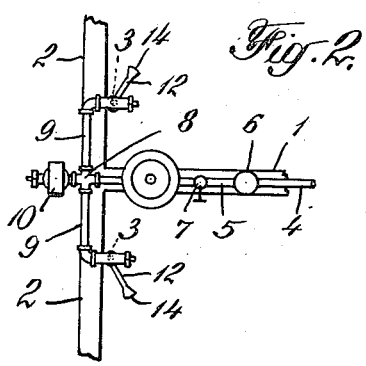
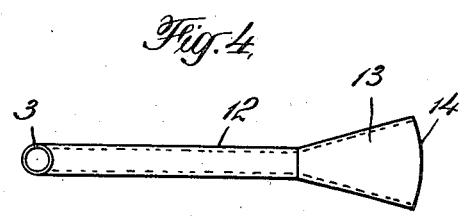
INVENTOR
Gregory A. Petroe
BY
ATTORNEYS Patented Feb. 10, 1942

2,272,818

UNITED STATES PATENT OFFICE 2,272,818

METHOD OF TREATING SOLUTIONS

Gregory A. Petroe, Niagara Falls, N. Y., assignor to The Mathieson Alkali Works, Inc., New York, N. Y., a corporation of Virginia Application July 27, 1939, Serial No. 286,945

2 Claims. (Cl. 23—1)

This invention relates to improvements in the dispersion, for absorption, in liquid media of liquefied but normally gaseous reagents. The field of the invention is illustrated by and comprises particularly the chlorination, with liquid chlorine, of aqueous solutions, suspensions and slurries. For example, in the preparation of sodium hypochlorite, caustic solutions are chlorinated by introducing chlorine into the solution. Likewise, in the manufacture of calcium hypochlorite, chlorine is introduced into milk of lime. Again, in the chlorination of pulp suspensions, in the processing of paper pulp, chlorine is introduced into the suspension.

The present methods of introducing chlorine into such liquid media are not entirely satisfactory in all instances. Unless a proper dispersion of the chlorine is obtained, there is a tendency either to build up excessive concentrations at or near the point of introduction with resulting irregularity in the chlorination or in the product of the chlorination, or both, or to permit the escape, unabsorbed, of part of the chlorine.

The sparger tube is perhaps the most generally used means for introducing chlorine into such liquid media, but as conventionally designed and operated it suffers from several disadvantages. The introduction of vaporized or partially vaporized chlorine through a submerged vertical dispersion tube, with vertically spaced apertures, suffers from the difference in head along the submerged part of the tube as well as from variations in head at particular points along the tube incident to the introduction of vaporized and vaporizing chlorine through the apertures in the tube. The introduction of the chlorine through the submerged open lower end of a vertical tube liberates most of the chlorine in the form of large unbroken bubbles tending to permit the escape, unabsorbed, of a considerable part of the chlorine. The effective agitation resulting from the introduction of chlorine in this manner is also confined to the region immediately adjacent to the tube end. The introduction of chlorine through a submerged horizontal perforated tube tends to be irregular because liquid tends to collect in the horizontal tube. Likewise, with such arrangements, the diffusion of the introduced chlorine between a number of apertures tends to make the resulting agitation ineffective to promote complete and uniform absorption of the chlorine.

This invention provides a method for dispersing liquefied but normally gaseous reagents, such as liquid chlorine, in liquid media, such as the aqueous solutions, suspensions and slurries mentioned, which is simple and efficient in operation and which requires but simple apparatus for its practice. The method of the invention is advantageous in applications generally in which complete, uniform absorption is important.

In applying this invention to chlorination, for example, the chlorine supplied as a liquid is discharged into the liquid to be chlorinated in the form of a horizontal expanding or fan-shaped film while maintaining sufficient pressure on the chlorine prior to discharge to prevent substantial vaporization of the chlorine up to the point of discharge and to cause the chlorine to be introduced into the liquid at such velocity that sufficient horizontal travel is imparted to the remnant portions of the film which do not vaporize as the result of the reduction of pressure on the chlorine as it is discharged to cause a circulatory agitating motion in the liquid being chlorinated. This is accomplished by introducing the chlorine into the liquid to be chlorinated through a sparger tube including a horizontally disposed fishtail, the orifice through which is restricted in area, while appropriately regulating the pressure under which liquid chlorine is supplied to the sparger tube with respect to the pressure in the vessel containing the liquid to be chlorinated and the rate of delivery of chlorine through the sparger tube. With this arrangement, the chlorine enters the liquid to be chlorinated in the form of a horizontal fan-shaped film. At the point of discharge from the sparger tube, or entry into the liquid to be chlorinated, the chlorine is liquid, or substantially liquid, but the vaporization incident to the reduction of pressure as the chlorine passes through the orifice at the end of the sparger tube begins at once. At the same time the chlorine, and particularly the unvaporized part of the chlorine, projected into the liquid to be chlorinated, tends to persist in moving through this liquid as fragments or filaments of the original fan-shaped film. Excellent dispersion of the chlorine through the liquid is thus obtained and this dispersion is promoted by the distribution of vaporization as just described.

A further detail of the introduction of chlorine in accordance with the invention resides in the utilization of the pressure drop of the introduced chlorine at the point of introduction to secure a peculiarly effective agitation. In the practice of the invention the energy of expansion of the liquid chlorine is made effective to attain maximum velocities in the region of introduction instead of being absorbed, or in part absorbed, in connections between the chlorine supply and the point of introduction into the liquid to be chlorinated. The resulting agitation, tending to revolve the liquid to be chlorinated within its body, in conjunction with the fan form introduction of the vaporizing chlorine, minimizes any escape of unabsorbed chlorine.

To obtain the maximum advantage of the peculiar agitation afforded by this invention, the discharge end of the sparger tube should be located eccentrically with respect to the horizontal section of the vessel containing the liquid to be chlorinated and either well above or well below, better well below, the mid-point of the vertical section of the vessel. In a square or rectangular tank, best results are obtained when the discharge end of the sparger tube is placed adjacent but directed away from one corner of the tank. In a round tank best results are obtained when the discharge end of the sparger tube is placed adjacent but directed away from the side of the tank on a line passing to one side of the center of the tank. When more than a single sparger tube is used, best results are obtained by placing them generally in the center of the tank and directed toward the periphery of the tank in a manner permitting each tube to establish the rolling agitation peculiar to it within a subdivision of the tank.

The practice of the invention also fully utilizes the refrigerating effect of the heat of vaporization of the chlorine in promoting the absorption of the chlorine.

The accompanying drawing illustrates apparatus appropriate for use in practicing the invention. In the drawing, Fig. 1 is a side elevation of a portion of a pair of adjacent rectangular tanks showing a sparger tube and connections for supplying liquid chlorine, Fig. 2 is a plan of the fragmentary elevation constituting Fig. 1, Fig. 3 is a fragmentary elevation of the sparger tube illustrated in Figs. 1 and 2 but on an enlarged scale and Fig. 4 is a plan of the discharge end of the sparger tube illustrated in Fig. 3.

The apparatus illustrated in Figs. 1 and 2 comprises a pair of tanks separated by a partition wall 1 and having a common end wall 2, two sparger tubes 3 arranged adjacent but to discharge away from the corners formed by the junction of walls 1 and 2. Liquid chlorine, delivered from conventional cylinders or drums for example, flows through connections 4 and 5, the control valve 7 and the cross 8 and connections 9 to the upper ends of the two sparger tubes 3. A cushion chamber 6 is provided to prevent damage to the connections and a pressure gauge 10, connected to the line beyond the control valve 7, is provided to facilitate control. The sparger tubes are secured to the side wall 2 by appropriate clamps 11.

Each of the sparger tubes 3 is formed of appropriate metal or alloy, silver for example, and is soldered, welded or sweated to the end of the distributing connection 9. The lower or submerged end of each sparger tube is turned to a horizontal, as at 12, and is flattened, as at 13, to form a fishtail with an orifice 14 smaller in area than the interior of the tube adjacent the reference numerals 3 and 12 in the drawing for example. This orifice may be and usually is smaller in area than the connections to the chlorine supply including the passage through the control valve in normal operating position. This orifice is sufficiently restricted with respect to the rate at which chlorine is to be delivered, to permit the maintenance of sufficient pressure from the source of supply through the sparger tube to the point of discharge at orifice 14 to prevent substantial vaporization of the chlorine up to the point of discharge. In carrying out the invention in this apparatus, sufficient pressure is maintained on the liquid chlorine down to the discharge end of the sparger tube to prevent substantial vaporization of the chlorine prior to discharge into the liquid to be chlorinated. Then, upon reduction of pressure as the chlorine passes through the orifice at the discharge end of the sparger tube, the chlorine, discharged into the liquid to be chlorinated in the form of a horizontal fan-shaped film, begins to vaporize and continues to vaporize as it is dispersed, by this introduction and the resulting agitation, in the liquid to be chlorinated. The dispersion secured is the joint result of the introduction of the chlorine as a horizontal fan-shaped film, of the progressive vaporization of the chlorine following its introduction, of the velocity of introduction of the chlorine as liquid, and of the agitation which in turn results from the particular manner of introduction which characterizes the invention.

The chlorination thus to be effected compares favorably, in uniformity and in efficiency for example, with chlorination effected by introduction of the chlorine through a porous diffusion medium or with independent mechanical agitation of the liquid to be chlorinated. Chlorination by means of this invention, moreover, is simpler and more economical than such conventional procedures. The advantages of the invention with respect to conventional sparger tube practices have previously been mentioned.

While the invention is particularly advantageous as applied to the chlorination of aqueous solutions, suspensions and slurries, it is applicable, with advantage, generally to the dispersion, for absorption, in liquid media of similar liquefied but normally gaseous reagents. The dispersion may be either for the purpose of effecting a solution or for the purpose of effecting a chemical reaction, for example. Some if not all of the advantages of dispersion in accordance with the invention are secured in either case.

I claim:

1. In the chlorination of liquid media, the improvement which comprises discharging chlorine into the liquid to be chlorinated through a horizontally disposed fishtail nozzle placed a substantial distance below the surface of the liquid so that the chlorine is discharged into the liquid in the form of a horizontally expanding film, maintaining sufficient pressure on the chlorine prior to its discharge into the liquid to prevent substantial vaporization of the chlorine up to the point of discharge and to cause the chlorine to be introduced into the liquid at such velocity that sufficient horizontal travel is imparted to remnant portions of the film to cause a circulatory agitating motion in the liquid.

2. In the chlorination of liquid media, the improvement which comprises discharging chlorine into the liquid to be chlorinated through a horizontally disposed fishtail nozzle placed in the lower portion of the body of liquid adjacent the periphery thereof so that the chlorine is discharged into the liquid in the form of a horizontally expanding film, maintaining sufficient pressure on the chlorine prior to its discharge into the liquid to prevent substantial vaporization of the chlorine up to the point of discharge and to cause the chlorine to be introduced into the liquid at such velocity that sufficient horizontal travel is imparted to remnant portions of the film to cause a circulatory agitating motion in the liquid.

GREGORY A. PETROE.